April 3, 1934.  V. GREGOR  1,953,853
FUEL BURNER
Filed Dec. 31, 1930
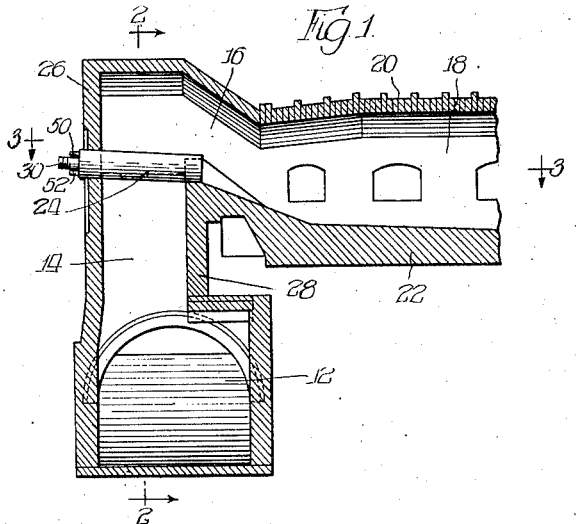
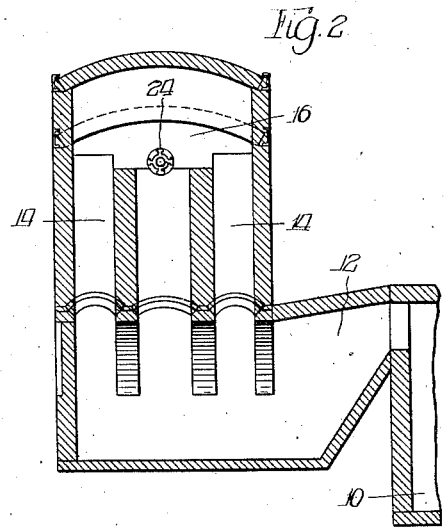
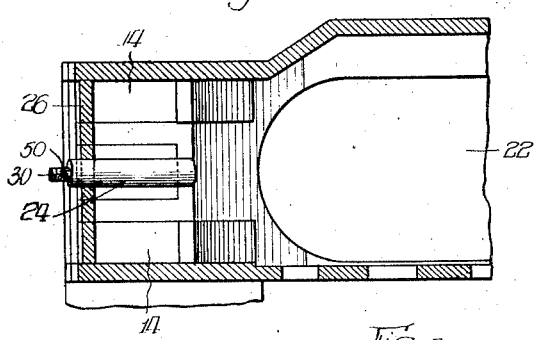
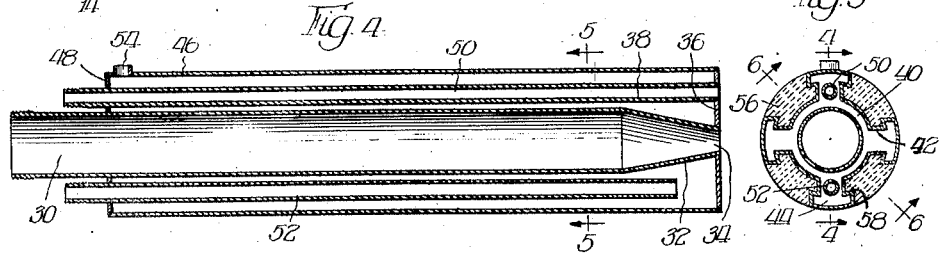
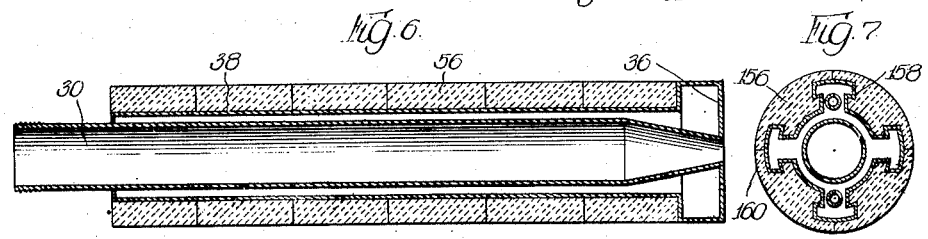
Inventor
Vaclav Gregor
By Usina and Rauber
Attys Patented Apr. 3, 1934

1,953,853

UNITED STATES PATENT OFFICE 1,953,853

FUEL BURNER

Vaclav Gregor, Gary, Ind.

Application December 31, 1930, Serial No. 505,911

6 Claims. (Cl. 158—1)

The invention relates to furnace construction and particularly to a liquid and gaseous fuel burner for association with metallurgical furnaces such as the open hearth furnace.

In the above type of furnace a combination of liquid and gaseous fuel, such as tar and coke oven gas, is commonly used to improve the operation of the furnace after the same has been running for an extended period of time with producer gas. After the furnace has been operating for an extensive number of heats with producer gas, the efficiency of the regenerative or checker chambers becomes very low due to the fact that the same become clogged with deposits and as a result the degree to which the air is preheated drops correspondingly causing the production of the furnace to fall off while fuel consumption increases. If tar or coke oven gas and tar is introduced at such times the furnace assumes normal operation with a return to normal fuel consumption. The fuels are introduced into the furnace by means of water cooled burners inserted across the air passages and through the walls at the respective ends of the furnace, thus placing the exposed water cooled element in the direct path of both the incoming hot air and the outgoing waste gases. The hot air coming from the regenerative or checker chambers is thus considerably cooled off and the waste gases leaving the furnace on the way to the regenerative chambers are likewise cooled so that the heat economy of the furnace is adversely affected.

An object of the present invention is to provide a water jacketed burner which will prevent the rapid transfer of heat from the air and waste gases to the water resulting in increasing the efficiency of the furnace with which the burner is associated and in decreasing the consumption of fuel.

To this end the present invention provides for the application of an outside lining of refractory brick, cement or any other refractory material to the water jacket of the burner so as to enclose and insulate the same, whereby the cooling effect on the incoming air and outgoing waste gases is removed and successful and economical operation of the furnace is secured.

Another object of the present invention is to provide a device of the kind described which will be simple in construction, economical to manufacture and which will fulfill all requirements of furnace operation.

With these and various other objects in view, the invention consists of certain novel features of construction and operation as will be more fully described and particularly pointed out in the specification, drawing and claims appended hereto.

In the drawing, which illustrates an embodiment of the device and wherein like reference characters are used to designate like parts—

Figure 1 is a fragmentary sectional view showing one end of an open hearth furnace equipped with the device of the present invention;

Figure 2 is a sectional view taken along the plane indicated by line 2—2 of Figure 1;

Figure 3 is a sectional view taken along the plane indicated by line 3—3 of Figure 1;

Figure 4 is a sectional view taken longitudinally of the burner constructed in accordance with the present invention;

Figure 5 is a sectional view taken along the plane indicated by line 5—5 of Figure 4;

Figure 6 is a sectional view taken longitudinally of the burner on the plane indicated by line 6—6 of Figure 5; and Figure 7 is a sectional view showing a modified form of burner construction.

For illustrating the application of the present device to furnaces, an open hearth type of furnace is selected but it will be understood that the present burner may be likewise associated with furnaces especially constructed for the continuous use of gaseous or liquid fuel, or a combination of the two. The open hearth furnace disclosed comprises regenerative or checker chambers 10 having connection through passage 12 to a plurality of air passages 14. The air passages 14 connect with the downwardly directed passage 16 which leads directly to the combustion chamber 18 of the furnace, formed by the arched roof 20 and the hearth bed 22. The construction of the furnace is similar at both ends and in operation air from the checker chambers is directed to the combustion chamber 18 and thus flows upwardly through the air passages 14 through the passage 16 where it unites with the fuel issuing from the fuel burner to be described, and thus supplies the necessary oxygen to produce the intense heat in the chamber 18 directly over the hearth bed 22. The operation is reversible and with the opposite end of the furnace operating as above, the air passages 14 will function to conduct the waste gases to the checker chambers 10 which heat the chambers before they are allowed to escape.

The fuel burner indicated in its entirety by 24 is inserted through the end wall 26 of the furnace and is disposed directly across one of the air passages 14 with its inward end resting upon the furnace wall 28. This locates the discharge end of the burner in a position where the fuel discharged thereby can readily unite with the incoming air from the passages 14 and burn in the combustion chamber 18 as is usual in open hearth operation. It is thus seen that the inward end of the fuel burner is exposed to intense heat and therefore it is customary to protect the burner by a water jacket, the construction of which will be described.

Referring to Figures 4 and 5 the burner 24 comprises a centrally disposed gaseous fuel burner pipe 30 having sloping walls 32 at its discharge end to form a restricted discharge orifice 34. Integrally secured to one end of the burner pipe 30 are end walls 36 which in turn unite with spaced cylindrical walls 38 to form part of the water jacket and thus the water chamber 40. The cylindrical walls 38 are interrupted at spaced intervals to provide connecting walls 42, which function to connect the water chambers 44 with the chamber 40. The arcuate longitudinal walls 46 of the chambers 44 are of a slightly greater width than the passage formed by walls 42 so as to provide, in connection with the passage, T-shaped portions equally spaced on the periphery of the cylindrical walls 38. To complete the construction of the water jacket end members 48 are provided with a centrally located aperture for allowing passage of the rear end of the fuel burner pipe 30.

A cylindrical pipe 50 is located within the water jacket and forms the liquid fuel burner pipe. The end wall 36 is provided with an aperture for allowing the discharge end of the same to pass therethrough, which, however, terminates flush with the exterior surface of the wall, the other end of the pipe passing through the rear wall 48 and extending a slight distance beyond the same. The cooling water is conducted to the extreme forward end of the water jacket by means of the supply pipe 52 and is discharged from the jacket through the outlet 54.

Heretofore the water jacket of the burner, due to the location of the burner in air passages 14, has been directly subjected to the influence of the hot air entering the combustion chamber, as well as the waste gases leaving the chamber and the resulting cooling in the waste gases has been sufficient to cause deposits of slag to form on the gas port uptake and gas slag pocket. These slow but continuous deposits of slag finally obstruct the passages to such an extent that little or no waste gases can reach the regenerative chambers, with the result that operation of the furnace must be discontinued to allow for repairs. In the case of the incoming air the lowering of its temperature affects the speed and intensity of the combustion of the fuel, as is well known in metallurgical processes. To overcome the above disadvantages, the present invention provides a covering 56 for the water jacket composed of refractory brick, refractory cement or any other suitable material. In the modification disclosed in Figure 5 the material 56 is interlocked with the water jacket by reason of the overhanging edges 58 and thus the longitudinally extending portion located between the chambers 44 of the water jacket can be divided, as shown in Figure 6, to form a plurality of arcuate portions.

With the modification disclosed in Figure 7 the portions 156 of insulating material are similarly interlocked by reason of the projecting edges 158 of the water jacket. In this case, instead of the material terminating flush with the arcuate walls 46 of the water jacket, the portions are provided with extensions 160 which overlap the wall 46 and thus the construction serves to thoroughly insulate all the exposed parts of the water jacket.

The improvements of the present invention are applicable to any burner used for liquid or gaseous fuels that can be introduced directly into any kind of a furnace by means of a pipe or similar conductor, subject however, to the condition that the furnace renders it necessary to water cool the burner pipe and that the fact that the same is water cooled results in interference with the most successful and economical operation of the furnace.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a burner of the type described, comprising a fuel supply pipe having a discharge end, a housing around said supply pipe providing a water jacket therefor, said housing being provided with outwardly projecting portions spaced thereon, and refractory material forming a covering for said housing and located in the gaps in the housing formed by the projecting portions.

2. In a burner of the type described, comprising a fuel supply pipe having a discharge end, a housing around said supply pipe providing a water jacket therefor, said housing being provided with outwardly projecting portions equally spaced on the periphery thereof, and refractory material forming a covering for said housing and located in the gaps in the housing formed by the projecting portions, said portions having overhanging edges for locking the material in place.

3. In a furnace of the character described, the combination with a regenerative chamber and an air passage leading to the combustion chamber of the furnace, of a burner located in said air passage for directing fuel to said combustion chamber, a water jacket enclosing said burner to protect the burner, and refractory material covering said jacket to insulate the walls of the jacket preventing influence on the temperature of the hot air in the air passages, said jacket having means for locking the refractory material thereon.

4. In a furnace of the character described, the combination with a regenerative chamber and an air passage leading to the combustion chamber of the furnace, of a burner located in said air passage for directing fuel to said combustion chamber, a water jacket enclosing said burner to protect the burner, and refractory material covering said jacket to insulate the walls of the jacket preventing influence on the temperature of the hot air in the air passages, said jacket having means extending longitudinally thereof for locking the refractory material to the jacket.

5. In a burner of the type described, a fuel supply pipe having a discharge end, a housing around said supply pipe providing a water jacket therefor, said housing being provided with outwardly projecting portions extending longitudinally thereof, refractory material forming a covering for said housing, said material being located between the projecting portions and being locked in place by means provided on said portions.

6. In a burner of the type described, a supply pipe for delivering a fuel to a furnace or the like, a housing for said supply pipe forming a chamber for containing a cooling fluid, said housing having portions projecting radially therefrom and extending longitudinally of the housing to provide longitudinally extending grooves on the periphery of the housing, and refractory material forming a covering for said housing, said material being located in said grooves and being retained in place by said projecting portions.

VACLAV GREGOR.